No. 112,432.
P. J. DWYER.
TOBACCO PIPE.
PATENTED MAR. 7, 1871.
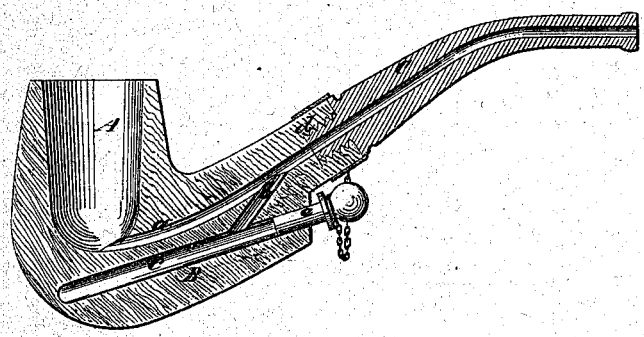
Witnesses
Fred. Haynes
R. T. Rabeau
Patrick J. Dwyer
per Simon Doubled
Attorney

United States Patent Office.

PATRICK J. DWYER, OF ELIZABETH PORT, NEW JERSEY.

Letters Patent No. 112,432, dated March 7, 1871.

IMPROVEMENT IN TOBACCO-PIPES.

The Schedule referred to in these Letters Patent and making part of the same.

*To all whom it may concern:*

Be it known that I, PATRICK J. DWYER, of Elizabeth Port, in the county of Union and State of New Jersey, have invented a new and useful Improvement in Smoking-Pipes; and I do hereby declare that the following is a full, clear, and exact description thereof, reference being had to the accompanying drawing forming a part of this specification.

This invention relates to that class of pipes in which a chamber is used for the reception and collection of the moisture which accumulates within the stem or tube in smoking.

Its object is to provide for the emptying of the said chamber without removing the stem of the pipe from the bowl, which operation, when constantly performed, wears away the joints and causes a leak in the pipe, and also without interfering with the direct passage from the bowl to the mouth-piece. To these ends—

It consists in the arrangement of the spittle-chamber in the shank of the pipe below the passage which communicates with the stem, and in connecting the chamber with said passage by a downwardly-diverging cross-passage near the outer end thereof.

The accompanying drawing represents a central longitudinal section of a pipe constructed according to my invention.

To enable others to understand the construction and nature of my invention, I will describe it with reference to the drawing.

A is the bowl of the pipe;

B, the shank thereof; and

C is the stem, represented as screwing into the shank at $c$.

Instead of giving to the passage $a$, which forms the communication between the bowl and stem of the pipe, an irregular course, as is done in most pipes, I make it in a direct line with the stem, thereby greatly facilitating the clearing of the pipe by a wire or wisp of straw inserted through the stem.

The shank B of the pipe is enlarged on the under side, and contains a chamber, $c$, which is arranged under the bowl, and passage $a$ has a mouth under the stem.

The mouth is fitted with a plug, $e$.

This chamber has no communication with the bowl of the pipe except through the passage $a$, with which passage it is connected by a passage, $b$, the direction of which is downward from the said passage into the said chamber.

As this cross-passage $b$ is much nearer a vertical position than the passage $a$, any moisture which may be collected in the passage $a$, either from the tobacco or from the mouth, will, as soon as it arrives at said passage $b$, drop through into the chamber $c$.

When the chamber $c$ becomes full it may be emptied while the pipe is charged, as it is only necessary to remove the plug $e$ and tip the pipe till the mouth of the chamber is sufficiently low to allow its contents to run out. In case of the passage $a$ and stem becoming choked by any solid or viscous matter, a straw or wire can be run directly through them without meeting with any obstruction from the chamber $c$ or passage $b$.

A bowl constructed in this manner can be made much more cheaply than those in which the smoke and residuum passages are formed partly in the stem, or where a separate pocket is screwed onto the bowl; it is also much more durable, more easily cleaned, and the communication between the chambers is more direct and positive.

What I claim as my invention, and desire to secure by Letters Patent, is—

1. The herein-described pipe, constructed with the enlarged shank B, in which is the chamber $c$, the mouth of which terminates beneath the stem C, and provided with plug $e$, all arranged as shown.

2. In combination with the above, the passage $a$, when communicating with chamber $c$ by means of passage $b$, said passage inclining inward to the center of the pipe, as shown, and for the purpose described.

PATRICK J. DWYER.

Witnesses:
JAMES NEWMAN,
JABEZ B. COOLEY.